United States Patent Office 2,868,588
Patented Jan. 13, 1959

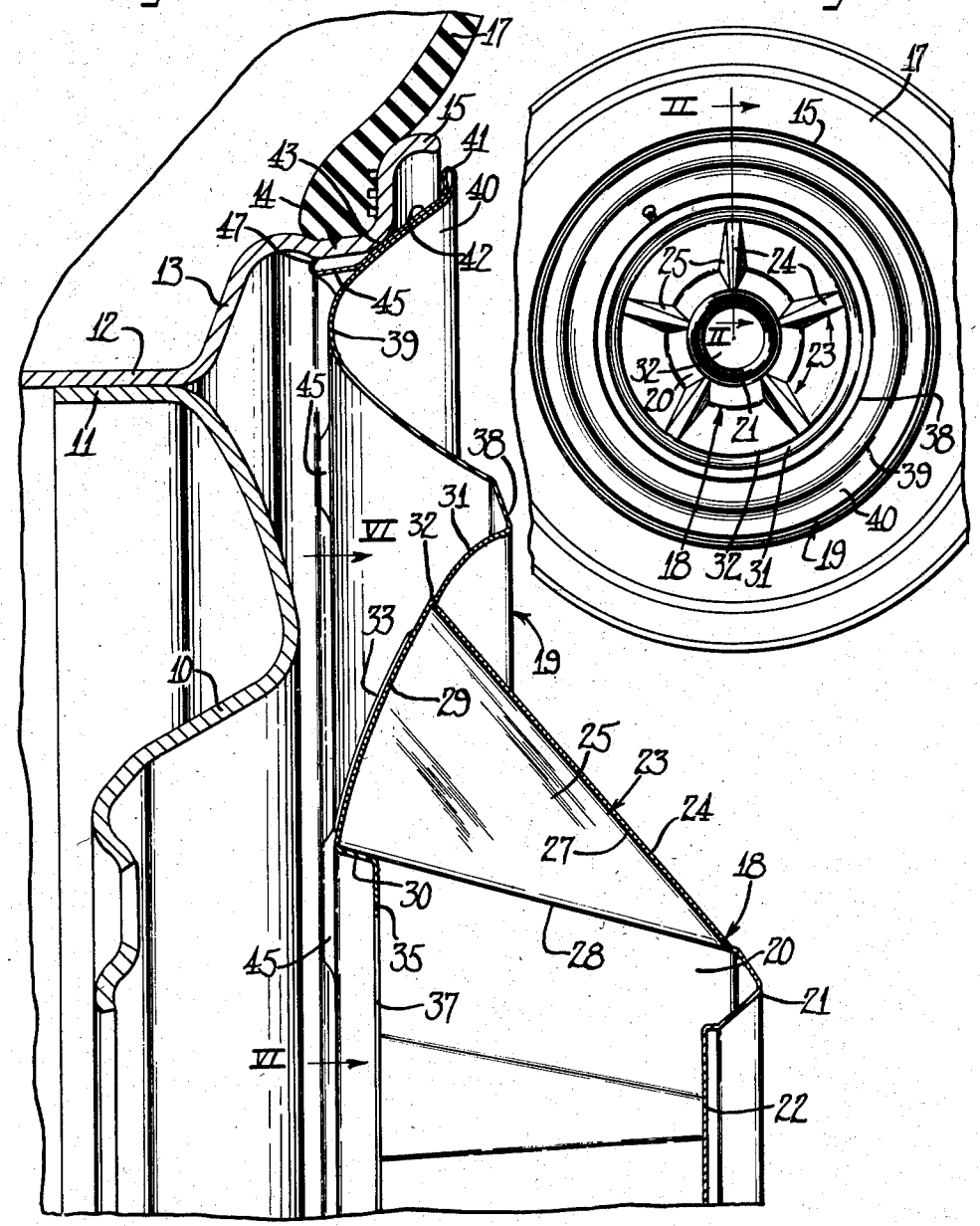

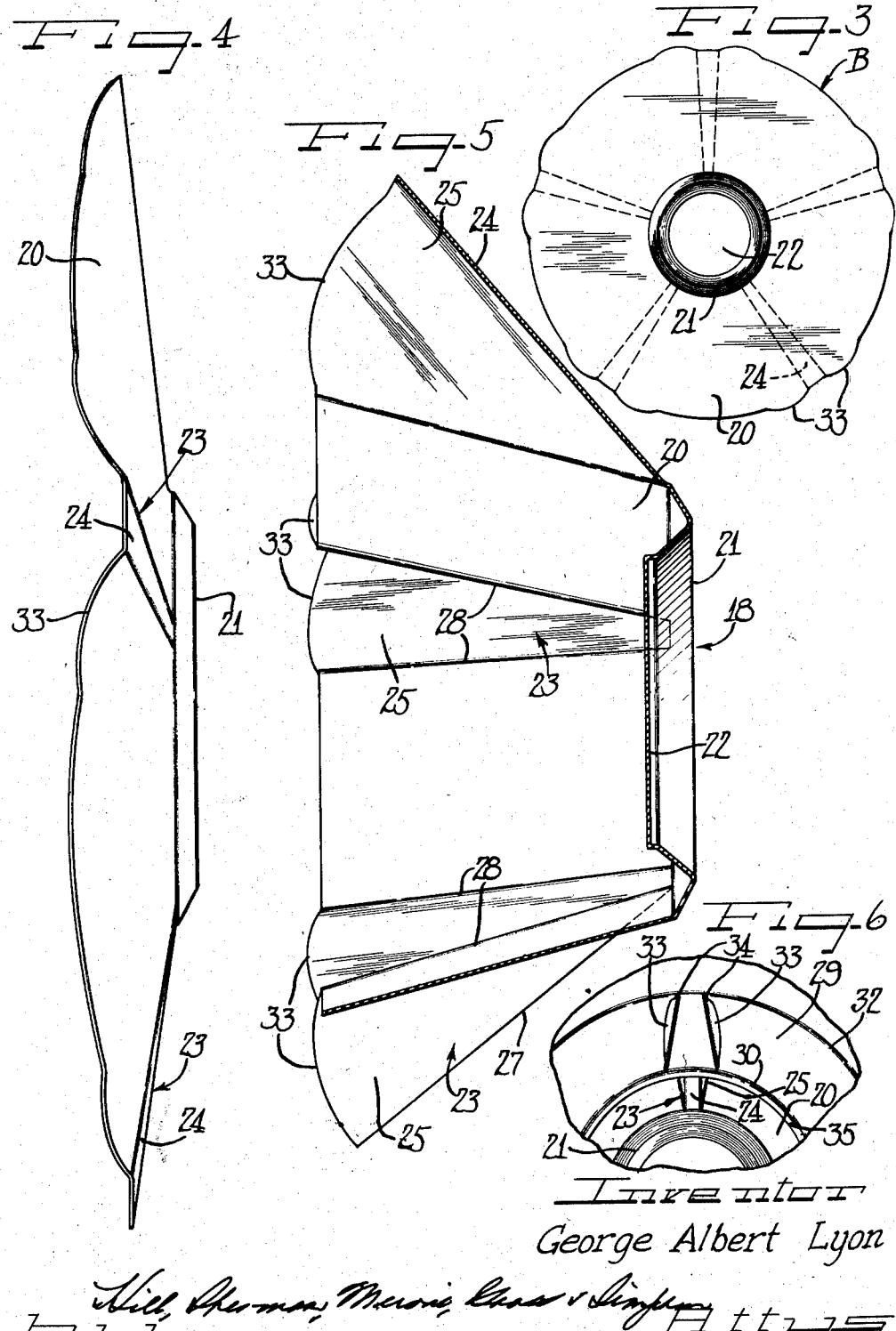

2,868,588
WHEEL COVER
George Albert Lyon, Detroit, Mich.
Application June 20, 1955, Serial No. 516,539
12 Claims. (Cl. 301—37)

The present invention relates to improvements in wheel structures and more particularly concerns the ornamental and protective covering of the outer sides of vehicle wheels.

Especially for some of the more expensive automobiles, ornamental configurations and depths of draw are desirable which substantially preclude shaping and drawing a wheel cover from a single piece of sheet material. It is desirable, however, to construct such wheel covers from sheet material components that can be economically made and simply and easily assembled and which will then provide a sturdy structure.

It is accordingly an important object of the present invention to provide a wheel structure having a novel cover for the outer side thereof affording a high crown pleasing ornamental effect.

Another object of the invention is to provide an improved wheel cover made up of a plurality of novel components which are easily fabricated as sheet metal stampings and are easily and simply assembled in a unitary structure.

A further object of the invention is to provide a novel crown structure for wheel covers.

Other objects, features and advantages of the present invention will be readily apparent from the following detailed description of a preferred embodiment thereof taken in conjunction with the accompanying drawings, in which:

Figure 1 is an outer side elevational view of a wheel structure embodying features of the invention;

Figure 2 is an enlarged fragmentary radial sectional view taken substantially on the line II—II of Fig. 1;

Figure 3 is a small scale plan view showing a blank layout for the novel crown component of the cover;

Figure 4 is an edge elevational view of the blank in a preliminary stage of formation thereof by manipulation of the sheet metal;

Figure 5 is a diametrical sectional view through the crown component of the cover in its completed form; and Figure 6 is a small scale fragmentary rear elevational view of the cover taken substantially in the plane of line VI—VI of Fig. 2.

A wheel cover as shown herein is adapted to be applied to the outer side of a vehicle wheel, such as an automobile wheel, having a disk spider wheel body 10 provided with an axially extending outer marginal attachment flange 11 secured in suitable fashion to a base flange 12 of a tire rim having extending therefrom an outer side flange 13 projecting generally radially outwardly and sloping axially outwardly to an intermediate generally axially outwardly but radially outwardly sloping flange 14 merging with a generally radially outwardly and then axially outwardly turned terminal flange 15. The flanges of the tire rim are constructed and related for supporting a pneumatic tire 17 which may be of the tubeless type or may be a tire and tube assembly.

According to the present invention the cover is provided with a high crown portion 18 and a radially outer portion 19. By virtue of the deep draw relationship as well as reentrant configurations of the cover portions it is difficult, and at least by presently practiced methods of sheet metal working impractical to make the same from a single sheet of material. Therefore, the cover portions 18 and 19 are constructed as separate drawn sheet metal members which are thereafter assembled in a unitary mutually reinforcing relation, affording in the assembly the appearance of a one piece structure. To this end, the cover members are formed from suitable sheet material such as sheet stainless steel or brass or the like capable of ready forming into the preferred shapes and also of receiving suitable finish, such as polishing and plating, enameling or the like. If desired, of course, different materials may be used in the crown cover member portion and the outer cover member portion, such as aluminum or other lightweight material for the crown portion 18 and stainless steel or brass for the radially outer cover portion 19.

A rigid rib-spoke reinforced construction of the crown cover member portion 18 is afforded by the provision of a generally conical or frusto-conical body 20 provided with an axially outer end annular crown ridge or rib 21 at juncture of the body 20 with an inwardly inset or dished central crown portion 22 which is adapted to receive a suitable medallion either applied thereto or directly embossed therein as preferred.

At suitable intervals such as five as shown, but which may obviously be fewer or more, as preferred, the crown member body 20 is provided with radially outwardly projecting and axially inwardly sloping buttress type rib-spokes 23. These are formed integrally in one piece with the body wall 20. In addition to a ridge wall 24 which slopes from the top of the crown, adjacent to the crown ridge 21 at a substantial differential angle to the body wall 20, each of the spoke ribs 23 has a pair of wing-like generally triangular side walls 25 which preferably flare laterally from rigid longitudinal rib-like respective junctures 27 with the ridge wall 24 and join the body wall 20 at longitudinal reinforcing inwardly directed respective rib junctures 28. This construction of the rib spokes 23 taken in conjunction with the reinforcing crown ridge rib 21 and the arched side wall panels of the crown 20 intermediate the spoke ribs affords a crown structure of substantial rigidity capable of withstanding much abuse without deformation or denting.

As best seen in Figs. 3, 4 and 5, the crown member portion 18 of the cover is adapted to be formed up from a flat sheet metal blank B. This blank is marginally trimmed to general circularity and is then centrally drawn to provide the crown rib 21 and the crown central recess portion 22 along circular lines as indicated on Fig. 3, and is drawn and folded along radial lines as indicated on the blank to at least initiate formation of the crown side wall 20 and the spoke ribs 23, as shown in Fig. 4. Thereafter, drawing and folding of the crown body side wall 20 and the spoke ribs 23 is completed to the final formation thereof as shown in Fig. 5.

Mounting of the crown cover member portion 18 upon and in permanently assembled relation with the radially outer cover member portion 19 is easily and effectively accomplished by the provision of means upon the cover member 19 for receiving the axially inner edge of the crown member 18 provided by the crown body wall 20 and the spoke ribs 23 in a close interlocked relationship. To this end, an annular central portion 29 of the cover member 19 is provided in a channel within which the edge of the crown member is seated. A centering shoulder flange 30 at the radially inner side of the annular cover portion 29 extends generally axially outwardly and is of a diameter to engage telescopically within the inner margin of the crown body wall 20. At the radially outer side of the annular cover portion or area 29 is a generally radially and axially outwardly sloping and in the present instance slightly transversely dished or concave annular cover portion 31 joining the annular cover portion 29 at a shallow offsetting annular rib shoulder 32 cooperable with the radially outermost terminals or tips of the rib spokes 23. In the assembly, therefore, the crown cover member 18 is maintained in centered relation by the inner flange 30 and is held against any tendency toward radial spreading by the rib shoulder 32, which also serves to afford a protective overlap for any possible rough edge at the rib tips and to avoid any possible slight gap that might be present due to manufacturing tolerances.

Fixed assembly of the crown member 18 to the supporting cover member 19 may be conveniently effected by attachment means such as tabs 33 extending from the axially inner end edges of the spoke ribs 23 and more particularly as extensions from the edges of the side walls 25 thereof. Such connecting tabs 33 project through appropriate slots 34 formed in the annular cover portion 29 and are bent over behind the cover portion 29 for interlocking and permanently securing the cover members together (Figs. 2 and 6).

As will be observed in Fig. 2, the central cover portion 29, supporting the crown member 18 is adapted to overlie the central portion of the wheel and more particularly the wheel body 10. Radially inwardly from the centering flange 30 may be provided a radially inwardly directed reinforcing flange 35 defining a central opening 37 for projection therethrough of an axle hub relative to which the wheel may be mounted in service. Such hub will be accommodated within the chamber inside the crown member 18 of the cover.

Radially outwardly from the central annular cover portion 29 of the cover member 19, the annular outwardly directed cover portion 31 preferably joins a generally axially outwardly directed annular reinforcing rib 38 providing a protective buffer about the base ends of the spoke ribs 23 and located at the radially inner side of an annular dished portion 39 which is adapted to overlie the outer side of the tire rim and juncture portion of the wheel body and has at the radially outer side thereof a generally radially and axially outwardly sloping annular marginal portion 40 for overlying the intermediate and terminal flanges 14 and 15 of the tire rim. An underturned extremity terminal finishing and reinforcing bead 41 on the cover margin 40 is adapted to lie in spaced relation to the tire rim terminal flange 15.

For retaining the cover on the outer side of the wheel, means such as a retaining finger structure similar to that covered in my Patent 2,624,634, issued January 6, 1953, may be utilized. To this end, the outer marginal portion 40 of the cover is provided as a radially and axially inward extension from the underturned edge reinforcing bead 41 with an annular underturned flange 42. In the present instance this flange 42 lies in nested or bottomed engagement behind the cover marginal portion 40 throughout a substantial extent of the width of the marginal cover portion and the structure thus formed is of a diameter to enable engagement of the axially and radially inner portion of the flange 42 against a shoulder 43 at juncture of the intermediate flange 14 of the tire rim with the terminal flange 15. Thereby the axially and radially outer portion of the flange 42 and the overlying cover portion 40, as well as the terminal or edge bead 41, are supported in spaced relation to the terminal flange 15 and provide therewith a substantial chamber within which balancing weights or the like may be concealingly disposed.

At its axially and radially inner extremity portion the flange 42 extends divergently generally radially and axially inwardly relative to the axially outer portion of the intermediate flange 14 of the tire rim and has a series of axially inwardly projecting and radially resiliently deflectable retaining fingers 45 each of which is provided with a short and stiff generally radially and axially outwardly oblique retaining terminal 47 which is engageable at its tip with the intermediate flange 14. Normally the tips of the retaining terminal flanges 47 extend to a slightly larger diameter than the inside diameter of the intermediate flange 14 of the tire rim. Therefore, as the cover is pressed axially inwardly onto the wheel, the terminal flanges 47 will cam over the tire rim shoulder 43 and along the inner face of the intermediate flange 14 and be deflected radially inwardly to place the retaining fingers 45 under resilient tension which reacts against the terminal tips to press the same into firm retaining gripping engagement with the intermediate flange 14.

Pryoff of the cover is effected by inserting a pryoff tool, such as a screwdriver or the like, behind the outer margin of the cover and effecting pryoff leverage behind the multi-layer reinforced marginal portion 40 and the underlying flange 42. Since the retaining fingers 45 are short in relation to width and of substantial number, as best seen in Fig. 2, comprising a circumferentially spaced series of, for example, eight to sixteen such fingers, it will be apparent that the cover will be effectively held upon the wheel against unintentional forces tending to displace the same.

Since the central portion of the cover is supported in spaced relation to the wheel body, the crown 18 of the cover is supported in resiliently cushioned relation because should there be unusually axially inward pressure against the crown, the inner portion of the cover member 19 can yield resiliently at least to a limited extent. This additionally protects the crown 18 from damage.

On the other hand, the crown cover member 18 and the supporting cover member 19 mutually cooperate to reinforce each other, especially in the portions thereof which are interengaged.

It will be understood that modifications and variations may be effected without departing from the scope of the novel concepts of the present invention.

I claim as my invention:

1. In a wheel cover for disposition at the outer side of a vehicle wheel, a circular cover member having an annular portion thereon, and a crown cover member having a circular side wall interrupted by circumferentially spaced generally radially extending buttress spoke ribs, the edge of said wall and said spoke ribs opposing said annular portion, and means for securing said edge to said annular portion.

2. In a wheel cover for disposition at the outer side of a vehicle wheel, a circular cover member having an annular portion thereon, and a crown cover member having a circular side wall interrupted by circumferentially spaced generally radially extending buttress spoke ribs, the edge of said wall and said spoke ribs opposing said annular portion, and means for securing said edge to said annular portion, said annular portion being defined at its radially inner and outer sides by centering and retaining shoulders between which said edge is retained.

3. In a cover for disposition at the outer side of a vehicle wheel, a circular cover member having an annular generally axially outwardly opening channeled portion of substantial width, and a generally circular crown member having an edge engaged in and retained within said channel, said channel having a radially inner centering flange and a radially outer retaining shoulder.

4. In a cover for disposition at the outer side of a vehicle wheel, a circular cover member having an annular inner portion, and a crown cover member having a generally annular flaring side wall provided with buttress rib spokes having flaring wing side walls joining the flaring wall of the crown member and projecting therefrom, the edge of said crown member and said rib spokes being secured in opposing relation to said annular portion.

5. In a cover for disposition at the outer side of a vehicle wheel, a circular cover member having an annular inner portion, and a crown cover member having a generally annular flaring side wall provided with buttress rib spokes having flaring wing side walls joining the flaring wall of the crown member and projecting therefrom, the edge of said crown member and said rib spokes being secured in opposing relation to said annular portion, said annular portion having at the radially outer side thereof a retaining shoulder.

6. In a cover for disposition at the outer side of a vehicle wheel, a circular cover member having an annular inner portion, and a crown cover member having a generally annular flaring side wall provided with buttress rib spokes having flaring wing side walls joining the flaring wall of the crown member and projecting therefrom, the edge of said crown member and said rib spokes being secured in opposing relation to said annular portion, said annular portion having at its radially inner side a circular centering flange engageable by the crown inner edge.

7. In a cover for disposition at the outer side of a vehicle wheel, a circular cover member having an annular portion, and a crown cover member secured to said annular portion and projecting axially outwardly therefrom, said crown cover member having side reinforcing rib spokes projecting generally radially outwardly and engaging said annular cover portion buttress-fashion and a crown annular reinforcing ridge rib adjacent to the axially outer ends of the rib spokes.

8. In a crown member for a vehicle wheel cover, a one piece sheet metal blank having a central crown portion from which slopes a generally annular side wall and said side wall having a plurality of radially outwardly folded buttress rib spokes therein having ridge portions sloping divergently generally radially outwardly and axially inwardly from said side wall and having the edges thereof facing generally axially inwardly.

9. In a method of making a crown cover member, drawing a central portion of a metal blank into a crown center, preliminarily folding up generally radially extending portions of the remainder of the blank outside of said central portion into spoke ribs, and completing the formation of the crown member by folding side portions of the ribs toward one another and bending intermediate portions of the blank into side wall panels between the ribs to provide a substantially frusto-conical body wall with buttress rib spokes emanating therefrom and terminating adjacent the central crown portion.

10. In a cover for disposition at the outer side of a vehicle wheel, a circular cover member having an inner annular portion facing generally axially outwardly and with generally radially outwardly facing centering shoulder means at the radially inner side of the annular portion, and a generally circular central crown cover member having an inner edge thereabout directed generally axially inwardly and abutting edgewise against and secured to said annular portion and maintained centered with relation to the first mentioned cover member by said centering shoulder means.

11. In a cover for disposition at the outer side of a vehicle wheel, a circular cover member having an inner annular portion facing generally axially outwardly, and a generally circular central crown cover member having an inner edge thereabout directed generally aixally inwardly and abutting edgewise against and secured to said annular portion, said annular portion of the cover member having a radially outer section thereof extending generally radially and axially outwardly a substantial distance beyond the central crown member and joining an annular generally axially outwardly projecting buffer rib formation on the circular cover member.

12. In a cover for disposiiton at the outer side of a vehicle wheel having a substantially axially outwardly projecting hub structure, a generally circular cover member having means for retaining the same in position on the wheel and including a cover member having a central inwardly dished portion provided with a central aperture through which the hub is projectable, and a high crown sheet metal crown portion having a sloping side wall engageable with said dished central cover portion about said opening and provided at a plurality of spaced circumferential intervals with radially outwardly projecting integral rib formations comprising generally radially outwardly offset portions of the crown side wall and having the edges thereof facing generally axially inwardly in opposition to the cover member in an annular area thereof about said central aperture and radially outwardly from the crown member side wall.

References Cited in the file of this patent

UNITED STATES PATENTS

| | | |
|---|---|---|
| D. 167,271 | McLeod | July 15, 1952 |
| 2,115,182 | Sinclair | Apr. 26, 1938 |
| 2,158,125 | Horn et al. | May 16, 1939 |
| 2,276,405 | Lyon | Mar. 17, 1942 |
| 2,544,705 | Lyon | Mar. 13, 1951 |
| 2,629,957 | Lyon | Mar. 3, 1953 |
| 2,650,862 | Lyon | Sept. 1, 1953 |
| 2,674,495 | Lyon | Apr. 6, 1954 |
| 2,725,257 | Maurer et al. | Nov. 29, 1955 |